United States Patent
Ismail

[15] 3,689,602
[45] Sept. 5, 1972

[54] HALOGENATED ESTERS OF THE PHOSPHORIC ACIDS

[72] Inventor: Roshdy Ismail, 5213 Spich, Rodderstrasse 6, Germany

[22] Filed: Jan. 27, 1969

[21] Appl. No.: 795,142

[30] Foreign Application Priority Data

Jan. 25, 1968 Germany ................D 55182

[52] U.S. Cl. ............260/936, 260/45.8 R, 260/45.95, 260/937, 260/954, 260/958, 260/961, 260/966, 260/967, 260/973, 260/975, 260/976, 424/209, 424/218
[51] Int. Cl. ......C07d 105/04, C07f 9/02, A01n 9/36
[58] Field of Search..............260/936, 966, 954, 967

[56] References Cited

UNITED STATES PATENTS

| | | |
|---|---|---|
| 3,297,631 | 1/1967 | Bown et al..............260/936 X |
| 2,561,493 | 7/1951 | Caprio et al. ..........260/966 X |
| 2,984,680 | 5/1961 | Walsh.....................260/967 X |
| 2,993,934 | 7/1961 | Rosen.....................260/966 X |

*Primary Examiner*—Joseph Rebold
*Assistant Examiner*—Anton H. Sutt
*Attorney*—Burgess, Dinklage & Sprung

[57] ABSTRACT

Halogenated esters of phosphoric acids of the formula:

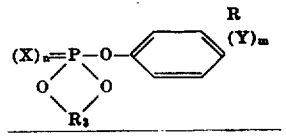

wherein R represents alkyl, X represents oxygen, Y represents halogen, other than fluorine, $R_3$ represents phenylene, halogenated phenylene, diphenylene, halogenated diphenylene, diphenylenealkane or halogenated diphenylenealkane, $n$ is 0 or 1 and $m$ is a whole number of from 2 to 4, as well as mono-(nitrophenyl)-di-polyhalophenyl phosphites or phosphates and di-(nitrophenyl)-polyhalophenyl phosphites or phosphates.

The above compounds have utility as insecticides, acaricides, pesticides and bactericides. They are also useful as flame retardants for plastics and as difficulty combustible dielectrics.

They are prepared by condensing an acid halide of phosphorus of the formula:

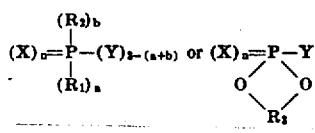

wherein $R_1$ is alkyl, alkenyl, cycloalkyl or aryl, $R_2$ is alkoxy ($C_{1-4}$), halogenated alkoxy ($C_{1-4}$), cyclo-alkoxy or aryloxy, $a$ and $b$ are whole numbers having a value of from 0 to 2, the sum of $a + b$ not exceeding 2 and $n$, $R_3$, X and Y are as above defined, with a halogenated phenol or alkyl substituted halogenated phenol

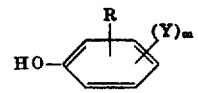

wherein R, Y and $m$ are as above defined, in the presence of a catalytic amount of at least one member of the group of tertiary amines, the amino group of which is part of an aromatic ring system, acid amides of phosphorus, arsenic and antimony compounds having bonds to organic radicals and salts of such amines and amides, at a temperature of from 50° to 220°C.

4 Claims, 1 Drawing Figure

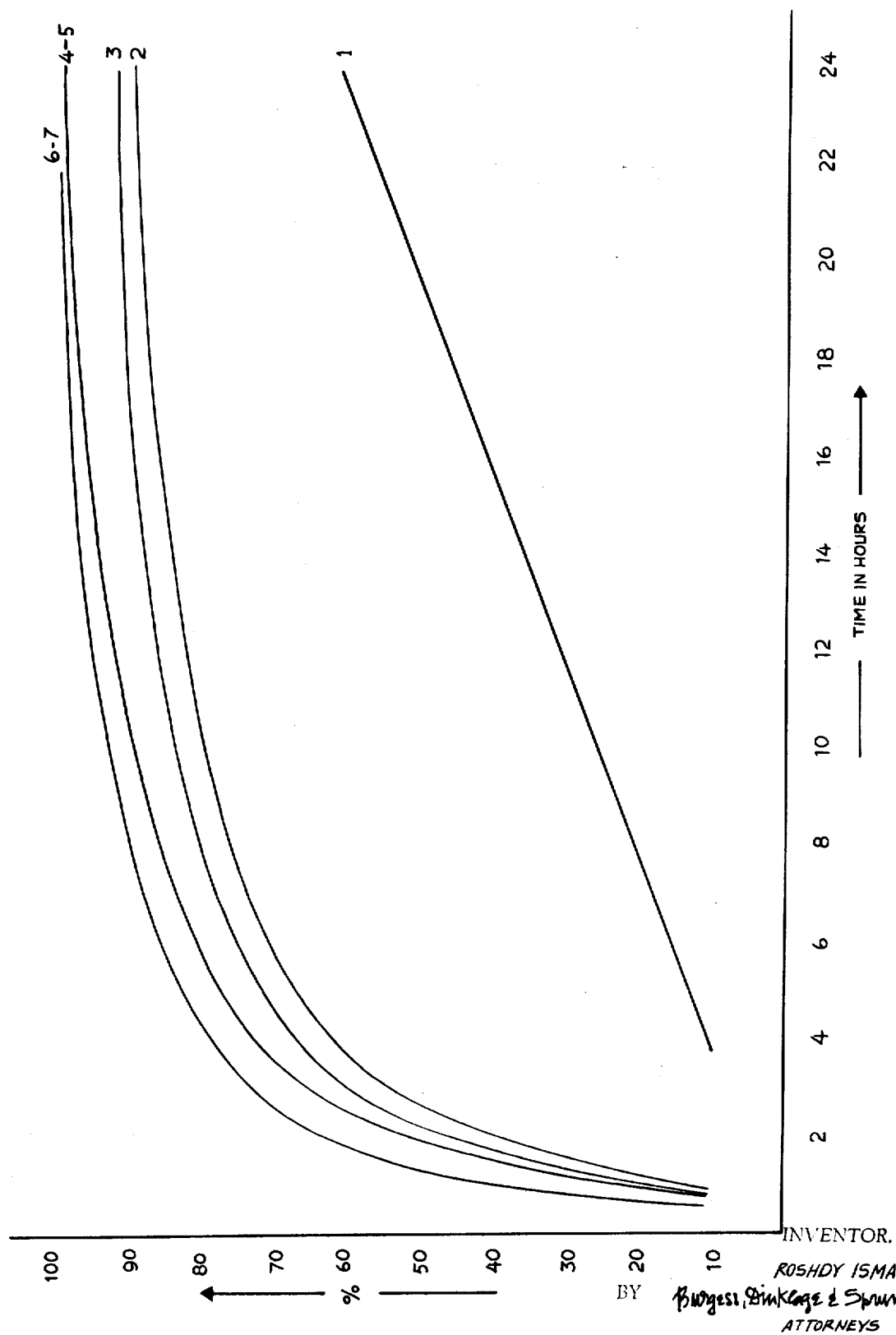

HALOGENATED ESTERS OF THE PHOSPHORIC ACIDS

This invention relates to a novel class of halogenated esters of phosphoric acids and to a method of preparing the same.

Methods are already known for the preparation of halogenated esters of the phosphoric acids. The known processes are, however, not economical and additionally are associated with considerable technical disadvantages. For example, it has heretofore been necessary to react pentachlorophenol with $POCl_3$ at 250°-300°C in the vapor phase, i.e., at relatively high temperatures in order to achieve anything like a useful yield.

In accordance with the invention, it has now been found that the disadvantages can be avoided and halogenated esters of phosphoric acids obtained in a simple and economically feasible manner by reacting, i.e., condensing an acid halide of phosphorus having one of the following formulas:

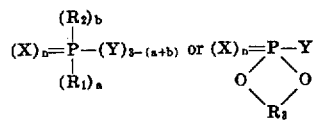

wherein $R_1$ represents alkyl, alkenyl, cycloalkyl or aryl, $R_2$ represents alkoxy having at least four carbon atoms, halogenated alkoxy having at least four carbon atoms, cycloalkoxy or aryloxy, $R_3$ represent phenylene, halogenated phenylene, diphenylene, halogenated diphenylene, diphenylenealkane or halogenated diphenylenealkane, X represents oxygen, Y represents halogen other than fluorine, $n$ has a value of 0 or 1, and $a$ and/or $b$ is a whole number of from 0 to 2, the sum of $a + b$ not exceeding 2, with a halogenated phenol or alkyl substituted halogenated of the formula:

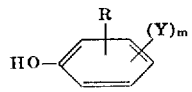

in which R represents alkyl, $m$ is a whole number of from 2 to 4 and Y has the same meaning as given above, in the presence of catalytic amounts of a tertiary amine, the amino group of which is a component of an aromatic ring system, and/or of an acid amide and/or of a phosphorus, arsenic or antimony compound containing bonds to organic radicals, and/or of a salt, and preferably a hydrochloride of the said amines, phosphorus, arsenic and antimony compounds or acid amides, as the case may be, at a temperature of 50° to 220°C and preferably 60° to 180°C. The instant condensation reaction can be carried out with or without the use of inert solvents.

The reaction according to the invention is preferably conducted at normal pressure, although an overpressure pressure of up to 12 atmospheres can be used. The use of elevated pressures, however, offers no substantial advantages over the normal pressure procedure.

The claimed reaction can be carried out in the fused state, as well as in the presence of inert solvents.

Suitable inert solvents for use in the process of the invention include aliphatic and aromatic hydrocarbons as well as simple and cyclic ethers. The aliphatic hydrocarbons can be used either as homogeneous compounds or as mixtures, such as for instance isooctane and benzine fractions, having a boiling range of from 120° to 180°C. Benzene, nitrobenzene, toluene and xylene are typical examples of suitable aromatic hydrocarbon solvents. Ethers that are suitable for use in carrying out the reaction include for example diisopropylether, diisoamyl ether, diphenyl ether, 1,4-dioxane and the like. The above listing of suitable ethers is indicative of the fact that both aliphatic and aromatic open-chained ethers can be used. Chlorinated hydrocarbons such as o-dichlorobenzene, tetrachloroethane and perchloroethylene are also usable as solvents for use in the process of the invention.

Suitable starting materials for carrying out the process of the invention include halogenated phenols and monovalent alkyl-substituted halogenated phenols and halogenated phenols of the formula:

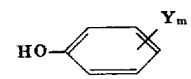

wherein Y represents halogen and $m$ is a whole number of from 2 to 5. Examples of suitable monovalent phenols are, for example, the fluorinated phenols such as pentafluorophenol, the chlorinated phenols such as 2,3-, 2,4-, 2,5-, 2,6-, 3,4- and 3,5-dichlorophenol, 2,4-dichloro-6-methylphenol, 2,6-dichloro-4-tert.butylphenol, 2,3,5-, 2,4,5- and 2,4,6-trichlorophenol, 2,3,4,6-tetrachlorophenol and pentachlorophenol, the brominated phenols such as 2,4- and 2,6-dibromophenol, 2,4,6-tribromophenol, pentabromophenol, and the iodized phenols such as 2,4- and 2,6-diiodophenol and 2,4,6-triiodophenol. Of course, mixtures of the above-named halogenated phenols can also be advantageously used for the reaction according the the invention.

In addition to the aforesaid compounds, divalent, halogenated phenols and alkyl substituted halogenated phenols of the formula:

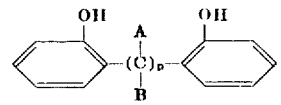

wherein A and B which can be alike or different, each represent hydrogen, alkyl having one to four carbon atoms ro cycloalkyl, and wherein $p$ is 0 or 1, are also suitable. Examples of suitable divalent phenols include 2,2'-methylene-bis-(3,4,6-trichlorophenol), 2,2'-propylene-bis-(3,4,6-trichlorophenol) and similar compounds.

The acid chlorides of phosphorus suitable for use in the invention have the formula:

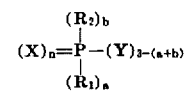

wherein $R_1$ represents alkenyl such as vinyl, allyl, and the like, straight or branched alkyl for instance methyl, ethyl, i-propyl, n-propyl, n-dodecyl, n-octadecyl, etc., cycloalkyl for example, cyclopentyl, cyclohexyl, etc., or aryl such as phenyl, naphthyl, etc., $R_2$ represents alkoxy having at least 4 carbon atoms or halogenated alkoxy having at least 4 carbon atoms, for example n-butoxy, n-decoxy, benzyloxy, and the like, cycloalkoxy such as cyclohexoxy and alkyl-substituted or aryloxy-substituted aryloxy and halogenated alkyl- or aryloxy substituted aryloxy such as phenoxy, m-phenoxyphenoxy, $\alpha$- and $\beta$-naphthoxy, 3-methylphenoxy, 3-trifluoromethylphenoxy, 3-dichloromethylphenoxy, 2.6-dimethylphenoxy, 2,4-di-tert.-butylphenoxy, and the like, X represents oxygen, $n$ is 0 or 1, $a$ and/or $b$ represents a whole number of from 0 to 2, the sum of $a$ plus $b$ not exceeding 2, Y is halogen other than fluorine.

Typical examples of suitable starting materials are, for example: phosphorus trihalides (phosphorus trichloride, phosphorus tribromide, etc.), phosphorus oxyhalides (phosphorus oxychloride, phosphorus oxybromide, etc.), phosphorus acid ester halides (phosphorus acid ethyl ester dichloride, phosphorus acid phenyl ester dichloride, phosphorus acid benzyl ester dichloride, and the like), phosphoric acid ester halides, phosphonic acid halides (phenylphosphonic acid dichloride and the like), phosphonic acid ester halides (phenylphosphonic acid phenyl ester chloride, etc.), phosphonous acid halides (phenylphosphonour acid dichloride, etc.), phosphonour acid ester halides (phenylphoshonious acid ethyl ester chloride, etc.).

In the acid chlorides or phosphorus which are to be used according to the invention and which have the formula:

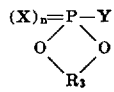

in which $R_3$, X and n have the same meanings as given above and Y represents halogen other than fluorine, the halogenated or non-halogenated phenylene, diphenylene or diphenylenealkane radicals in the ring can also be substituted. The substitutents will be the alkoxy group or halogen.

Acid chlorides of phosphorus according to the just mentioned formula are illustrated, for example, by 2,2'-diphenylenephosphorus acid chloride, 2,2'-diphenylenephosphorus acid chloride or 1,2-diphenylenephosphorus acid chloride.

The acid chlorides of phosphorus and the halogenated phenols are used in the preparation of the halogenated ester of pyrophosphoric acid, preferably in a stoichiometric ratio, i.e., 1 mol of halogenated phenol is used per mol of chlorine in he phosphoric acid chloride. The yield of halogenated esters of pyrophosphoric acid can be improved by using an excess of phenolic compounds.

Illustrative of the tertiary amines the amino group of which is a component of an aromatic ring system, and which are suitable for carrying out the process according to the invention are, for example, pyridine, isoquinoline, pyrazine, oxazine, quinazoline, oxazole, oxadiazole, benzothiazole, and the like. Mixtures of the aforementioned aromatic tertiary amines are also suitable for use as catalysts for the condensation reaction.

The HCl tension of the dihydrochlorides at the reaction temperature has been found to be an indication of the suitability of an aromatic tertiary amine, the HCl tension of the dihydrochloride having to be lower than the reaction pressure. At normal pressure, therefore, those amines will be used whose HCl tension in the temperature range of the process is lower than 760 mm Hg. At normal pressure it is preferable to use those amines whose HCl partial pressures at 50° to 180°C range from 80 to 700 mm Hg, i.e., the dihydrochlorides of the aromatic tertiary amines which are usable according to the invention are thermally unstable in the reaction range, but are still present in a formation-decomposition equilibrium.

Acid amides which can be N-mono substituted or disubstituted, and which are suitable for carrying out the process according to the invention are the carboxylic acid amides of monobasic and dibàsic aliphatic, aromatic and araliphatic, saturated or unsaturated carboxylic acids having one to 18 carbon atoms. The monobasic acids include, as for example, such acids as formic acid, acetic acid, propionic acid, butyric acid, capronic acid, 2-ethylhexanic acid. In the case of caprylic acid, lauric acid, palmitic acid, stearic acid, benzoic acid, phenylacetic acid and phenylbutyric acid these can be straight-chained or branched, or interrupted in the alkyl chain by a keto group, as for example, in connection with racemic acid, acetoacetic acid or levulinic acid. As examples of suitable acid amides of dibasic, unsaturated carboxylic acids there may be mentioned the maleic acid and fumaric acid amides. Ammonia, monoamines or diamines including hydrazine are suitable as fases for forming the acid amides herein involved. Primary or secondary monoamines or diamines are preferred for use herein which are derived from the saturated, aliphatic, araliphatic or cycloaliphatic series or from the aromatic series having only one aromatic ring. Examples of such amines are methylamine, dimethylamine, di-n- and di-i-propylamine, di-n- and di-isobutylamine, di-2-methylhexylamine, dilaurylamine, ethylenediamine, tetramethylenediamine, hexamethylenediamine, cyclohexylamine, dicyclohexylamine, benzylamine, dibenzylamine, aniline, methyl aniline, toluidine, phenylenediamine and hexahydrophenylenediamine. As acid amides derived from mono-amines, there have been found to be particularly suited the acid amides derived from amines having 20 to six carbon atoms. One or both of the alkyl groups present in the amines can also be substituted or replaced by phenyl or toluyl radicals or by cycloalkyl groups having five to six carbon atoms on the ring, which an also be substituted, if desired, by alkyl groups and particularly one or two methyl groups. Of the diamines which have been found to be advantageous as amine components for use in the preparation of the acid amides, special mention should be made of those in which the two amine groups are separated by one to eight methylene groups. In the diamines, the hydrogen atoms still bonded to the nitrogen atom can all be, but at least one should be substituted as for example by alkyl groups having one to four carbon atoms, or by phenyl, toluyl, or cycloalkyl radicals having five to six members. Instances of preferably carboxylic acid amides that can be used as catalysts according to the invention are: formamide, methylformamide, diethylformamide, acetamide, N,N-di-methylacetamide, N,N-di-n- or N,N-di-i-propylbutyramide, N,N-di-n- or N,N-di-sio-butyramide, N-benzylbutyric acid amide, N,N-dipropylethylhexanic acid amide, acetoacetic acid-N,N-di-n-butylamide, acetoacetic acid anilide, benzoic acid benzylamide, N,N-dimethylbenzoic acid amide and N,N'-diformyl-hexamethylenediamine. Additionally, cyclic acid amides or imides can also be advantageously utilized.

Acid amides of the barbituric acids are suitable as catalysts in the condensation reaction of the invention. The barbituric acids can be substituted by hydrocarbon radicals, and particularly by methyl, ethyl, propyl, i-propyl, n-butyl, iso-butyl and phenyl groups. Examples of the latter compounds are dimethylbarbituric acid, diethylbarbituric acid, dipropylbarbituric acid, diallylbarbituric acid, di-n-butylbarbituric acid and phenylethylbarbituric acid.

It is not necessary in accordance with the invention to use already prepared amides as catalysts. Instead, the components which under the reaction conditions form the particular catalyst, e.g., a mixture of a primary or secondary monoamine or diamine as above set out and one of the indicated monocarboxylic acids or an acid chloride or anhydride derived from these acids, can be used. The acid amides are than formed under the conditions of the reaction. Sulfonamides are also suitable catalysts, as for example, such compounds as 4-sulfamoylacetaniline, N'-amidino-sulfaniliamide and N'-2-pryridylsulfanilamide.

Phosphorus acid amides, such as hexamethylphosphorus acid amide, hexamethylphosphoric acid amide, hexa-n- or hexa-iso-butylphosphorus acid amide and phosphorus acid trimorpholide, also can be used as catalysts. Phosphoric acid triamides are also suitable for use as catalyst, but the same are somewhat inferior in their catalytic action to the phosphorus acid amides.

Titanic acid amides and stannic acid amides, such as dipropoxytitaniumdiamide, and di-n- or di-iso-butyl tin diamide have also been found to be suitable as catalysts for the condensation reaction.

Silazanes, such as diphenyl-di-(dibutylamino)-silane, diphenyl-di-(diethylamine)-silane and methylphenyl-di-(propylamino)-silane, are included as acid amides having catalytic activity in the instant reaction.

Phosphorus, arsenic or antimony compounds having bonds to organic radicals, which are usable as catalysts for the condensation include the following onium compounds and phosphorus and antimony hydride derivatives: triphenylmethylphosphonium iodide, triphenylbenzylphosphonium chloride, p-xylyene-bis-(triphenylphosphonium chloride), p-xylyene-bis-(triethylphosphonium bromide), tetraethylphosphonium bromide, triethyloctadecylphosphonium iodide, bis-(triethylphosphoniumacetal)-1,4-butane, triphenylmethylarsonium iodide, triphenylmethylarsonium hydroxides, triphenylethylarsonium iodide, triphenylhydroxyethylarsonium chloride, tributylphosphine, triphenylphosphine, tributylstibine, and triphenylstibine.

Of course, mixtures of the above named catalytic agents can also be used as catalysts, especially those which have been prepared on a basis of aromatic tertiary amines and acid amides.

The catalysts are used in quantities of 0.1 to 10 mol percent, preferably 0.1 to 5 mol percent with reference to the quantity of phosphoric acid chloride.

Under the conditions of the reaction according to the invention, the condensation takes place rapidly, and with the separation of stoichiometric quantities of gaseous HCl. In this manner, easily isolatable halogenated esters of the phosphoric acids are formed in good yields and in a high degree of purity.

The phosphoric acid esters prepared according to the invention can be used as insecticides, acaricides, pesticides and bactericides. Furthermore, they are usable a as difficultly combustible dielectrics and flame retardant substances for plastics.

The invention will be further illustrated by the following Examples, the same are in nowise to be construed as a limitation thereof.

EXAMPLE 1

Phenyl-di-(pentachlorophenyl)-phosphate 19.5 g phosphoric acid phenyl ester dichloride ($BP_{12}$ 110°-112°C) and 53.3 g of pentachlorophenol, 260 ml of toluene and 1 ml of quinoline were placed in a three-necked flask equipped with a stirrer, cooler and introduction tube. The reaction mixture was kept at at the boiling temperature of the toluene and was maintained under stirring. The HCl gas which was evolved in the reaction was scavenged from the reaction mixture with $N_2$, recovered in NaOH solution and titrated.

The evolution of hydrochloric acid was substantially complete after about 18 hours. 100 ml of toluene were removed from the reaction mixture by distillation. Upon cooling, a white, crystalline product was precipitated.

Yield: Approx. 90 percent. Melting Point: 182°-183 °C

The following chemical structure was determined for the product:

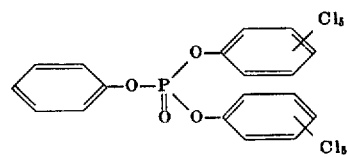

The product corresponded to phenyl-di-(pentachlorophenyl)-phosphate.

EXAMPLE 2

Tri-(2,4,6-tribromophenol)-phosphate 15.35 g (0.1 mol) of $POCl_3$, 99.3 g (0.3 mol) of 2,4,6-tribromophenol, 300 ml of toluene and 1 ml of N,N-di-butylbenzoic acid amide were combined in a three-necked flask equipped with stirrer, cooler and introduction tube.

The reaction mixture was kept at the boiling temperature of the toluene and maintained under stirring. The HCl gas which was thereby evolved was flushed out of the reaction mixture with $N_2$ and recovered in NaOH solution, which was titrated at the completion of the reaction. After about 24 hours the reaction was entirely finished.

140 ml of toluene were distilled out of the mixture. The product was a white, crystalline substance. The yield amounted to 85 percent. M.P. 97°-101°C; when recrystallized from cyclohexane, M.P. 101°-103°C.

EXAMPLE 3

(4-methylphenyl)-di-(pentachlorophenyl)-phosphate 22.5 g (0.1 mol) of phosphoric acid-(4-methylphenyl)-dichloride, 53.3 g (0.2 mol) of pentachlorophenol in 250 ml of toluene, and 1 ml of hexabutylphosphorus acid amide were introduced into a three-necked flask equipped with stirrer, cooler and introduction tube.

The reaction mixture was stirred at the boiling temperature of the toluene. The HCl gas which was thereby liberated was flushed out of the reaction mixture with $N_2$ and absorbed into NaOH solution which was titrated after the reaction had been completed. The toluene was then distilled off. The crude product was recrystallized from xylene. The product was a white, crystalline substance and was recovered in a yield of about 80 percent. M.P. 167°–169°C.

EXAMPLE 4

Phenyl-di-(2,3,4,6-tetrachlorophenyl)-phosphonate 39 g of phenylphosphonic acid dichloride, (0.2 mol) and 92.76 g of 2,3,4,6-tetrachlorophenol (0.4 mol), 260 g of toluene and 1 g of triphenylmethylphosphonium chloride were introduced into a three-necked flask equipped with stirrer, cooler and introduction tube. The reaction mixture was kept at the boiling temperature of the toluene while the same was stirred. The HCl gas which developed in the reaction was flushed from the reaction mixture with $N_2$, absorbed into NaOH solution and titrated.

The hydrochloric acid development was substantially completed after about 24 hours. 100 ml of toluene were distilled off from the reaction mixture. Upon cooling, a white, crystalline product was precipitated out. Yield approx. 90 percent. M.P. 170°C.

EXAMPLE 5

Tri-(pentachlorophenyl)-phosphate 115 g of phorphorus oxychloride and 600 g of pentachlorophenol, 900 ml of toluene and 2 ml of formamide were combined in a three-necked flask equipped with a stirrer, cooler and introduction tube. The reaction mixture was kept at the boiling temperature of the toluene, under stirring. The HCl gas which was evolved by the condensation was flushed out of the reaction mixture with $N_2$, absorbed in NaOH solution and titrated.

The evolving of the hydrochloric acid was substantially completed after about 30 hours. Upon cooling, a white, crystalline product precipitated out in 80 percent of its yield. M.P. 228°–230°C. After recrystallization from toluene, the product had a melting point of 232°–234°C.

Analysis established that the product crystallized with 1 mol of toluene.

EXAMPLE 6

Tris-(pentachlorophenyl)-phosphite 13.75 g of $PCl_3$. 79.95 g of pentachlorophenol, 300 ml of toluene and 1.0 g of N,N-diphenylcarbodiimide were combined in a three-necked flask equipped with stirrer, cooler and introduction tube.

The reaction mixture was stirred at the boiling temperature of the toluene, the HCl gas which was thereby developed was flushed out of the reaction mixture by means of nitrogen, and absorbed in NaOH solution, which was titrated after the reaction had been completed. The reaction was terminated after about 8 hours.

140 ml of toluene were distilled off from the mixture. The product was recovered as a white, crystal line product in an 85 percent yield. M.P.: 206°C.

In the same way, $PCl_3$ and pentachlorophenol were reacted without catalyst. After 24 hours, 70 percent of the HCl had split off. After this the HCl was evolved at a relatively show rate.

EXAMPLE 7

Phenyl-di-(2,3,4,6-tetrachlorophenyl)-phosphonate 39 g of phenylphosphonic acid dichloride (0.2 mol) and 92.76 g of 2,3,4,6-tetrachlorophenol (0.4 mol), 260 ml of toluene and 1 g of acetoacetic acid anilide were introduced into a three-necked flask equipped with stirrer, cooler and introduction tube. The reaction mixture was kept at the boiling temperature of the toluene, with stirring. The HCl gas that developed was flushed out of the reaction mixture with nitrogen, absorbed into NaOH solution, and titrated.

The evolution of hydrochloric acid had practically ended after about 24 hours. 100 ml of toluene were separated off from the reaction mixture by distillation. Upon cooling, a white, crystalline product was precipitated out. Yield approx. 80 percent. M.P. 170°C.

EXAMPLE 8

Di-(p-nitrophenyl)-(pentachlorophenyl)-phosphate 52.4 g of sodium salt of p-nitrophenyl were reacted with 14.8 ml of $POCl_3$ in 250 ccm of xylene in a three-necked flask provided with stirrer, cooler and introduction tube.

After about 2 hours, the precipitated NaCl was removed by filtration. The reaction mixture was then stirred at the boiling temperature of the xylene, together with 0.5 g of tributylphosphine and 21.6 g of pentachlorophenol.

After about 10 hours the reaction had ended. The crude product which remained after the evaporation of the solvent had a melting point of 150° to 154°C. Following recrystallization from toluene the melting point of the compound was 160° to 162°C.

EXAMPLE 9

Phenyl-di-(pentachlorophenyl)-phosphate was synthesized as follows: 19.5 g of phosphoric acid phenyl ester dichloride ($BP_{12}$: 110°–112°C) and 53.3 g of pentachlorophenol were reacted in 120 ml of xylene, and in the presence of 0.5 ml of N,N-dimethylacetoacetic acid amide, in a three-necked flask provided with a stirrer, cooler and introduction tube. The reaction mixture was kept at the boiling temperature of the xylene, and the mixture maintained under stirring. The HCl gas which was thereby evolved was flushed from the reaction mixture with $N_2$, dissolved in NaOH solution, and titrated.

The hydrochloric acid evolvement had practically been completed after about 12 hours. The toluene was distilled off from the reaction mixture. Upon cooling, phenyl-di-(pentachlorophenyl)-phosphate remained, as a white, crystalline product.
Yield: approx. 92 percent. M.P. 183°C.

EXAMPLE 10

Tri-(pentachlorophenyl)-phosphate was prepared as follows. Using a procedure similar to that of Example 1, 15.35 g of phosphorus oxychloride and 79.8 g of pentachlorophenol were reacted in 100 ml of xylene and in the presence of 0.5 ml of hexamethylphosphorus acid triamide as catalyst.

The hydrochloric acid development had substantially completely ended after about 18 hours. Following evaporation of the solvent a white product, as above identified, was precipitated. Yield: 93 percent, M.P. 228°C.

EXAMPLE 11

A procedure similar to that set out in Example 1, was followed excepting that 0.5 g of di-n-tolylcarbodiimide was used as catalyst in place of N,N-dimethylacetoacetic acid amide. The reaction was completed after about 12 hours.

Yield of phenyl-di-(pentachlorophenyl)-phosphate, approx. 90 percent. M.P. 182°C.

EXAMPLE 12

Phenyl-di-(2,3,4,6-tetrachlorphenyl)-phosphate was prepared as follows: 39 g of phenylphosphonic acid dichloride (0.2 mol) and 92.7 g of 2,3,4,6-tetrachlorophenol (0.4 mol) were brought to reaction in 200 ml of xylene and in the presence of 0.5 ml of hexamethylphosphorus acid amide in a three-necked flask provided with stirrer, cooler and introduction tube.

After about 18 hours the reaction had been completed.

Following evaporation of the solvent a white product was precipitated out.

Yield: approx. 90 percent. M.P. 169°C.

EXAMPLE 13

7.67 g of $POCl_3$ and 39.9 g of pentachlorophenol were reacted in 120 ml of xylene and in the presence of 0.5 ml of tributylphosphine in a three-necked flask provided with stirrer, cooler and introduction tube.

The reaction mixture was kept at the boiling temperature of the xylene, with stirring. The HCl gas which was thereby evolved was flushed out of the reaction mixture with $N_2$, recovered in NaOH solution, and its quantity determined by titration.

The evolution of hydrochloric acid was substantially complete after 24 hours.

Upon cooling, a white product precipitated out: M.P. 287°C, yield 96 percent. It was identified as tris-pentachlorophenylphosphate.

EXAMPLE 14

A procedure analogous to Example 5 was followed, excepting that 0.5 g of triphenylbenzylphosphonium chloride was used as the catalyst in place of tributylphosphine.

Tris-pentachlorophenylphosphate was precipitated out after about 24 hours in the form of a white product. M.P. 288°C, yield 95 percent.

EXAMPLE 15

40.7 g (0.1 mol) of hexachlorophene and 21.1 g (0.1 mol) of phenolphosphoryldichloride were reacted in 250 ml of xylene and in the presence of 0.4 ml of tributylphosphine in a 500 ml three-necked flask provided with stirrer, cooler and nitrogen feeding tube. The HCl gas which was evolved was flushed out of the boiling reaction mixture with nitrogen and absorbed in caustic soda solution.

The reaction had ended after 12 hours. The xylene was completely removed by distillation.

The resulting condensation product had a melting point of 164°C.

EXAMPLE 16

42 g of diphenyl-(o,o')-phosphoryl chloride and 160 g of pentachlorophenol were reacted in 250 ml of xylene and in the presence of 0.5 ml of tri-n-butylphosphine in a 250 ml three-necked flash equipped with stirrer, cooler and nitrogen feed tube.

The HCl gas which was evolved in the condensation was flushed out of the boiling reaction mixture with nitrogen.

The reaction had ended after 24 hours. The xylene was completely distilled off from the reaction mixture.

The residue had a melting point of 157 to 158°C:

|        | Theory % | Found % |
|--------|----------|---------|
| C(%):  | 43.6     | 43.5    |
| H(%):  | 1.61     | 1.4     |
| Cl(%): | 35.8     | 35.6    |
| P(%):  | 6.25     | 6.1     |

EXAMPLE 17

38.1 g of (2,2'-diphenylene)-phosphorus acid chloride (B.P. 174°C) 381 g of pentachlorophenol, and 1 ml of N,N-dibutylbenzoic acid amide were combined in 200 ml of toluene in a three-necked flask provided with stirrer, cooler and introduction tube. The reaction mixture was stirred at the boiling temperature of the toluene. The HCl gas which developed was removed from the reaction mixture by flushing with nitrogen.

After 5 hours, about 70 percent of the HCl had been split off and after about 12 hours the reaction had ended.

The crude product had a melting point of 190°C. Recrystallization from cyclohexane resulted in a product having a melting point of 125° to 127°C.

The following chemical formula was determined for the product:

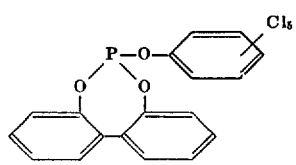

The substance therefore corresponded to (2,2'-diphenylene)-pentachlorophenylphosphite.

EXAMPLE 18

(2,2'-diphenylene)-pentabromophenylphosphite 30.5 g of (2,2'-diphenylene)-phosphorus acid chloride (B.P. 174°C), 59.5 g of pentabromophenol and 1 ml of tributylphosphine were combined in 200 ml of toluene in a three-necked flask equipped with stirrer, cooler and introduction tube.

The reaction mixture was stirred at the boiling temperature of the toluene. The HCl gas which was thereby evolved was removed from the reaction mixture with the aid of nitrogen.

After 24 hours the reaction had ended.

The crude product was washed with acetic ester and vacuum dried. M.P.: 160°C.

EXAMPLE 19

40.7 g (0.1 mol) of hexachlorophene, 19.5 g (0.1 mol) of phenylphosphonous dichloride, 250 ml of xylene and 1 ml of butyl formamide were reacted in a 500 ml three-necked flask provided with stirrer, cooler and nitrogen introduction tube. The liberated HCl gas was flushed out of the boiling reaction mixture with nitrogen and recovered in caustic soda solution.

The reaction had ended after 10 hours (conversion 98 percent). The xylene was totally removed by distillation. The residue had a melting point of 195°C.

EXAMPLE 20

40.7 g (0.1 mol) OF hexachlorophene, 21.1 g (0.1 mol) of phenylphosphoryldichloride, 250 ml of xylene and 0.4 ml of hexamethylphosphorus acid triamide were brought to reaction in a 500 ml three-necked flask provided with stirrer, cooler and nitrogen introduction tube. The HCl gas which was evolved was flushed out of the boiling reaction mixture with nitrogen and recovered in soda lye.

The reaction had ended after 14 hours. The xylene was distilled off completely from the reaction mixture.

The residue had a melting point of 163° to 164°C.

I claim:

1. A halogenated ester selected from the group consisting of
   a. di-(p-nitrophenyl)-(pentachlorophenyl)-phosphate,
   b. (2,2'-diphenylene)-pentachlorophenylphosphite, and
   c. (2,2'-diphenylene)-pentabromophenylphosphite.

2. A compound according to claim 1 designated di-(p-nitrophenyl)-(pentachlorophenyl)-phosphate.

3. A compound according to claim 1 designated (2,2'-diphenylene)-pentachlorophenylphosphite.

4. A compound according to claim 1 designated (2,2'-diphenylene)-pentabromophenylphosphite.

* * * * *

Dyn. 528

UNITED STATES PATENT OFFICE
CERTIFICATE OF CORRECTION

Patent No. 3,689,602　　　　Dated Sept. 5, 1972

Inventor(s) ROSHDY ISMAIL

It is certified that error appears in the above-identified patent and that said Letters Patent are hereby corrected as shown below:

Cover page, column 1, after Inventor listing insert --Assignee: Dynamit Nobel Aktiengesellschaft, Troisdorf, Germany--; column 2, line 51, change "ro" to --or--; column 3, line 10, change "2.6" to --2,6--; column 3, line 10, after "2,6-dimethylphenoxy," insert --p-tert.-butylphenoxy--; column 5, line 43, change "(diethylamine)" to --(diethylamino)--; column 8, line 9, change "crystal line" to --crystalline--; column 10, line 7, change "phenolphosphoryldichloride" to --phenylphosphoryldichloride--; column 12, line 2, change "OF" to --of--.

Signed and sealed this 8th day of May 1973.

(SEAL)
Attest:

EDWARD M. FLETCHER, JR.　　　　ROBERT GOTTSCHALK
Attesting Officer　　　　　　　　Commissioner of Patents